United States Patent
Gao et al.

(10) Patent No.: US 12,301,889 B2
(45) Date of Patent: May 13, 2025

(54) SYSTEMS AND METHODS FOR BLENDING BLOCK SECTIONS IN A PARTITION-BASED PREDICTION MODE

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/244,827

(22) Filed: Sep. 11, 2023

(65) Prior Publication Data
US 2024/0267567 A1    Aug. 8, 2024

Related U.S. Application Data

(60) Provisional application No. 63/443,363, filed on Feb. 3, 2023.

(51) Int. Cl.
*H04N 7/12* (2006.01)
*H04N 19/124* (2014.01)
(Continued)

(52) U.S. Cl.
CPC ........... *H04N 19/86* (2014.11); *H04N 19/124* (2014.11); *H04N 19/157* (2014.11); *H04N 19/176* (2014.11)

(58) Field of Classification Search
CPC ..................................................... H04N 19/86
See application file for complete search history.

(56) References Cited

U.S. PATENT DOCUMENTS

| | | |
|---|---|---|
| 2007/0009044 A1 | 1/2007 | Tourapis et al. |
| 2013/0070854 A1 | 3/2013 | Wang et al. |

(Continued)

FOREIGN PATENT DOCUMENTS

| | | |
|---|---|---|
| WO | WO 2013048033 A1 | 4/2013 |
| WO | WO 2020054060 A1 | 3/2020 |

OTHER PUBLICATIONS

Elliott Karpilovsky et al., "Proposal: New Inter Modes for AV2", Alliance for Open Media, Codec Working Group, Document: CWG-B018_v1, Feb. 24, 2021, 6 pgs.

(Continued)

*Primary Examiner* — Young Lee
(74) *Attorney, Agent, or Firm* — Morgan, Lewis & Bockius LLP

(57) ABSTRACT

The various implementations described herein include methods and systems for encoding and decoding video. In one aspect, a method of video decoding includes receiving video data that includes a first block from a bitstream, where the first block is encoded using a first partition mode. The method further includes identifying first and second sections of the first block and identifying blending values for blending the first and second sections. The blending values are obtained from one or more lookup tables (LUTs). The LUTs include values ranging from 0 to N, a first value in the LUTs is set to 0 and corresponds to a portion that is outside of a first blending region, and a second value in the LUTs is set to N and corresponds to a portion that is outside of a second blending region. The method also includes decoding the first block using the blending values.

20 Claims, 11 Drawing Sheets

(51) Int. Cl.
*H04N 19/157* (2014.01)
*H04N 19/176* (2014.01)
*H04N 19/86* (2014.01)

(56) References Cited

U.S. PATENT DOCUMENTS

| | | | |
|---|---|---|---|
| 2013/0169613 | A1 | 7/2013 | Chen et al. |
| 2017/0332084 | A1 | 11/2017 | Seregin et al. |
| 2018/0070100 | A1 | 3/2018 | Chen et al. |
| 2020/0036966 | A1 | 1/2020 | Na et al. |
| 2020/0036992 | A1 | 1/2020 | Lim et al. |
| 2020/0162728 | A1 | 5/2020 | Van der Auwera et al. |
| 2020/0275112 | A1 | 8/2020 | Chiang et al. |
| 2021/0067776 | A1 | 3/2021 | Reuze et al. |
| 2021/0112253 | A1 | 4/2021 | Xu et al. |
| 2021/0160520 | A1 | 5/2021 | Chen et al. |
| 2021/0185329 | A1 | 6/2021 | Merkle et al. |
| 2021/0243452 | A1 | 8/2021 | Zhao et al. |
| 2021/0258574 | A1 | 8/2021 | Gao et al. |
| 2021/0368193 | A1 | 11/2021 | Chen et al. |
| 2022/0116586 | A1 | 4/2022 | Esenlik et al. |
| 2022/0224897 | A1 | 7/2022 | Zhang et al. |
| 2022/0256144 | A1 | 8/2022 | Lim et al. |
| 2022/0337844 | A1 | 10/2022 | Deng et al. |
| 2023/0034458 | A1 | 2/2023 | Chen et al. |
| 2024/0015333 | A1 | 1/2024 | Chen et al. |
| 2024/0155149 | A1 | 5/2024 | Zhang et al. |
| 2024/0214579 | A1 | 6/2024 | Kidani et al. |

OTHER PUBLICATIONS

Tencent Technology, ISRWO, PCT/US2023/032523, Jan. 23, 2024, 15 pgs.
Tencent Technology, ISRWO, PCT/US2023/032527, Jan. 23, 2024, 20 pgs.
Tencent Technology, ISRWO, PCT/US2023/032530, Dec. 20, 2023, 14 pgs.
Tencent Technology, ISRWO, PCT/US2023/032532, Dec. 18, 2023, 6 pgs.
Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.
Han Gao et al., "Wedge Mode Extensions", Document: CWG-C092_v1, Alliance for Open Media Codec Working Group, Dec. 14, 2022, 4 pgs.
Leo Zhao et al., "Advanced Motion Vector Difference Coding", Document: CWG-B092, Alliance for Open Media, Codec Working Group, Nov. 24, 2021, 7 pgs.
Leo Zhao et al., "Improved Adaptive MVD Resolution", Document: CWG-C011, Alliance for Open Media, Codec Working Group, Feb. 9, 2022, 7 pgs.
Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.
Xin Zhao et al., "Tool Description for AV1 and Libaom", Document: CWG-B078_v1, Alliance for Open Media Codec Working Group, Oct. 4, 2021, 41 pgs.
Yue Chen et al., "An Overview of Core Coding Tools in the AV1 Video Codec", 2018 IEEE Picture Coding Symposium, San Francisco, CA, USA, 5 pgs.
Yoshitaka Kidani et al., "Geometric Partitioning Mode with Inter and Intra Prediction for Beyond Versatile Video Coding", IEICE Transactions on Information and Systems, vol. E105-D, No. 10, Oct. 2022, 13 pgs.

SYSTEMS AND METHODS FOR BLENDING BLOCK SECTIONS IN A PARTITION-BASED PREDICTION MODE

RELATED APPLICATIONS

This application claims priority to U.S. Provisional Patent Application No. 63/443,363, entitled "Flexible Blending for Wedge-Based Prediction" filed Feb. 3, 2023, which is hereby incorporated by reference in its entirety.

TECHNICAL FIELD

The disclosed embodiments relate generally to video coding, including but not limited to systems and methods for non-linear blending of block sections in wedge-based prediction modes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes using non-linear blending functions, adaptive blending widths, and corresponding lookup tables for blending block sections. The use of non-linear blending functions and/or adaptive blending widths improves coding accuracy (e.g., reduces artifacts in the decoded video data) as compared to linear blending functions and fixed blending widths. Additionally, using lookup tables to obtained quantized values corresponding to the blending function improves coding efficiency as complex blending functions can be replaced with simple lookup functions.

In accordance with some embodiments, a method of video decoding is provided. The method includes (i) receiving video data comprising a plurality of blocks, including a first block, from a video bitstream, where the first block is encoded using a first partition mode; (ii) in accordance with the first partition mode, identifying a first section of the first block and a second section of the first block; (iii) identifying a plurality of blending values for blending the first section and the second section, the plurality of blending values obtained from one or more lookup tables, where (a) the one or more lookup tables include values ranging from 0 to N, (b) a first value in the one or more lookup tables is set to 0 and corresponds to a portion of the first section that is outside of a first blending region, and (c) a second value in the one or more lookup tables is set to N and corresponds to a portion of the second section that is outside of a second blending region; and (iv) decoding the first block using the plurality of blending values.

In accordance with some embodiments, a method of video encoding is provided. The method includes (i) receiving video data comprising a plurality of blocks, including a first block, where the first block is to be encoded using a first partition mode; (ii) in accordance with the first partition mode, identifying a first section of the first block and a second section of the first block; (iii) identifying a plurality of blending values for blending the first section and the second section, the plurality of blending values obtained from one or more lookup tables, where (a) the one or more lookup tables include values ranging from 0 to N, (b) a first value in the one or more lookup tables is set to 0 and corresponds to a portion of the first section that is outside of a first blending region, and (c) a second value in the one or more lookup tables is set to N and corresponds to a portion of the second section that is outside of a second blending region; and (iv) encoding the first block using the plurality of blending values.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder component).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes, among other things, using various partitioning techniques for partitioning video blocks for more optimal motion prediction and higher quality encoding. The present disclosure also describes using adaptive blending functions and/or adaptive blending widths for blending the different sections of a partitioned block. The use of adaptive blending functions and/or adaptive blending widths improves coding accuracy (e.g., reduces artifacts in the decoded video data) as compared to fixed blending functions and fixed blending widths. Additionally, the adaptive blending functions may include non-linear blending functions, which may improve coding accuracy as compared to using a linear blending function. The present disclosure also describes using lookup tables for blending the block sections. Using lookup tables to obtained quantized values corresponding to a blending function improves coding efficiency as computationally-complex blending functions can be replaced with computationally-simple lookup functions. The use of lookup tables may also reduce hardware requirements and thus simplify encoder/decoder architecture (e.g., resulting in smaller devices).

Example Systems and Devices

Figure 1:
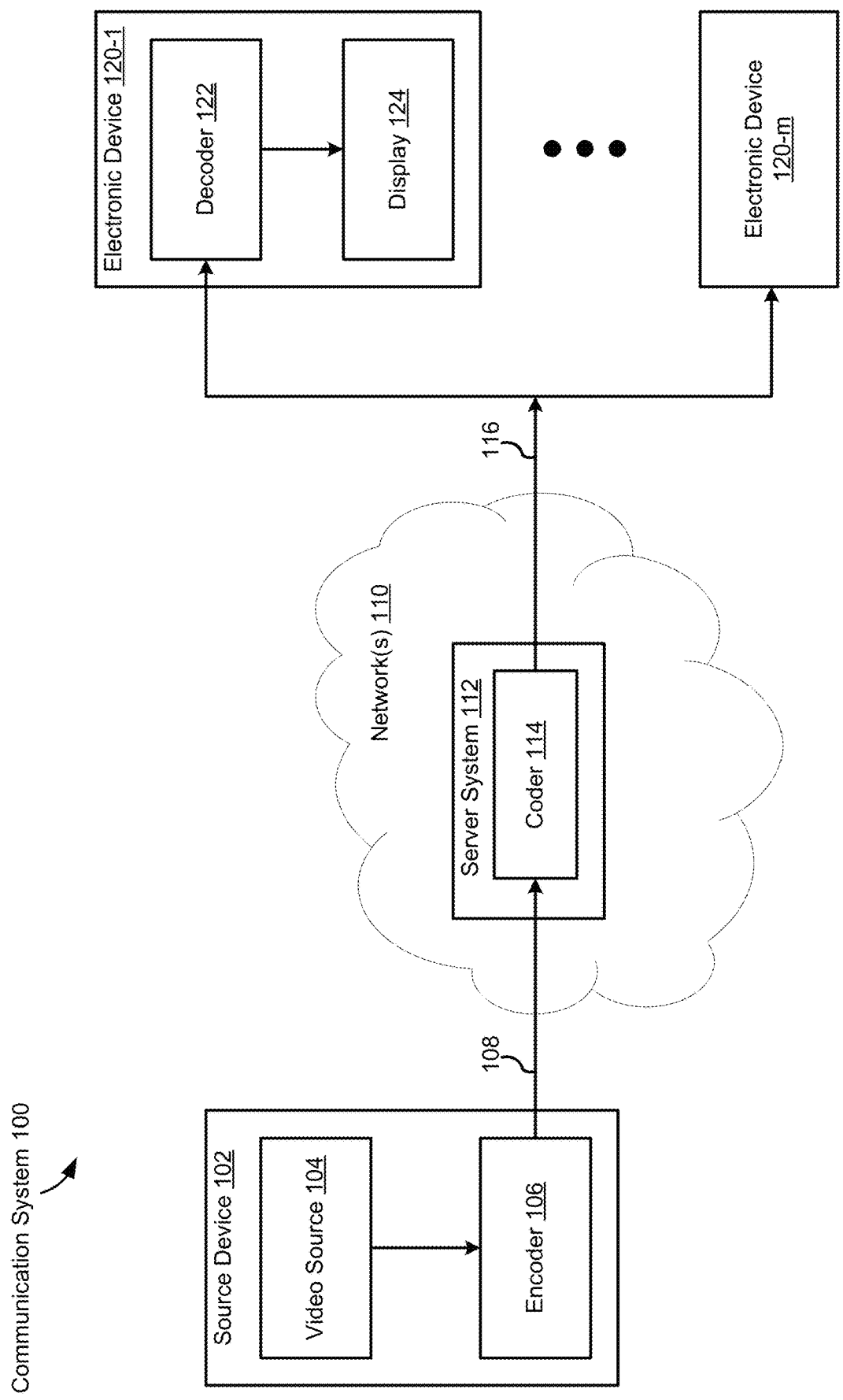
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
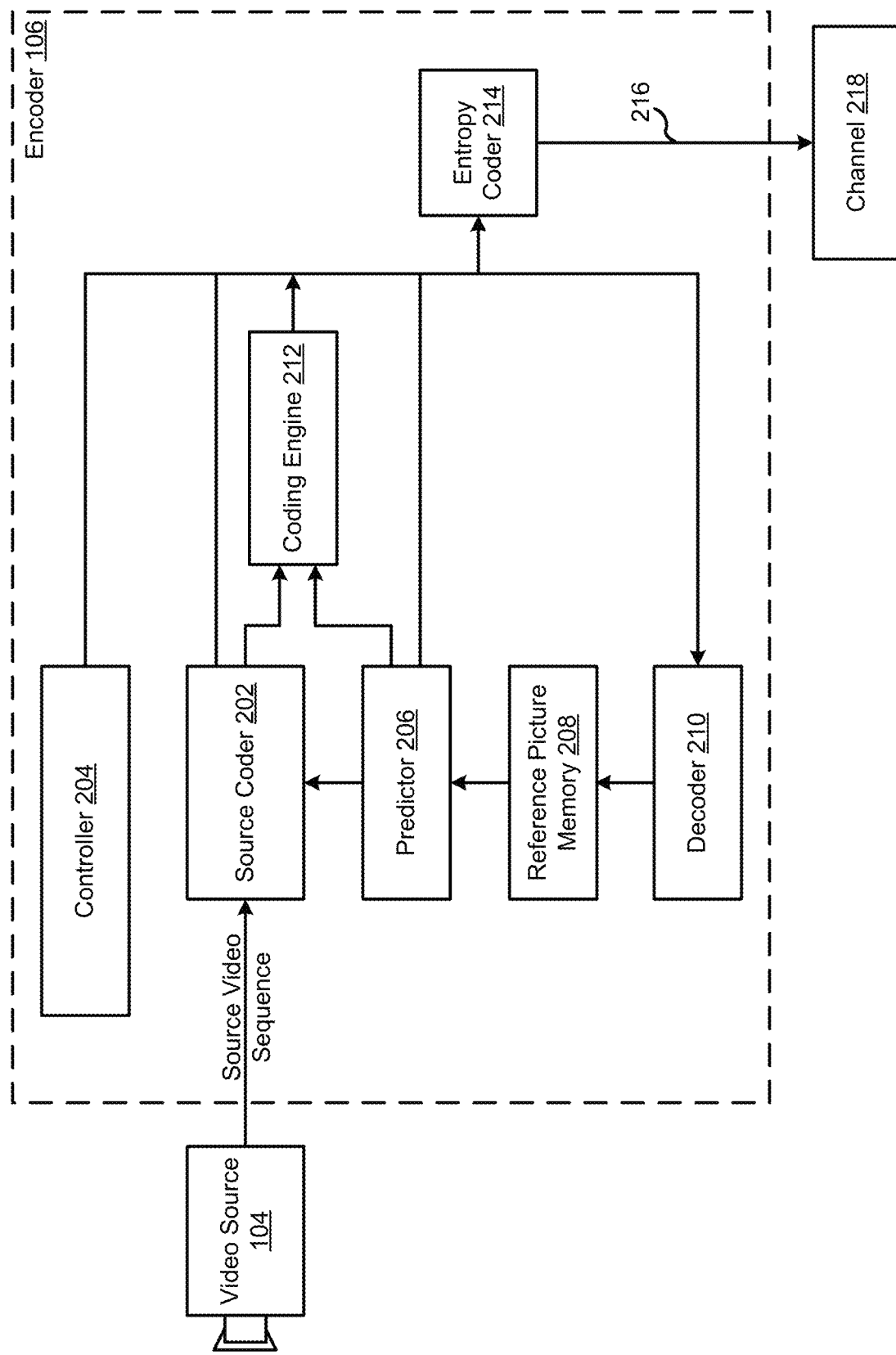
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
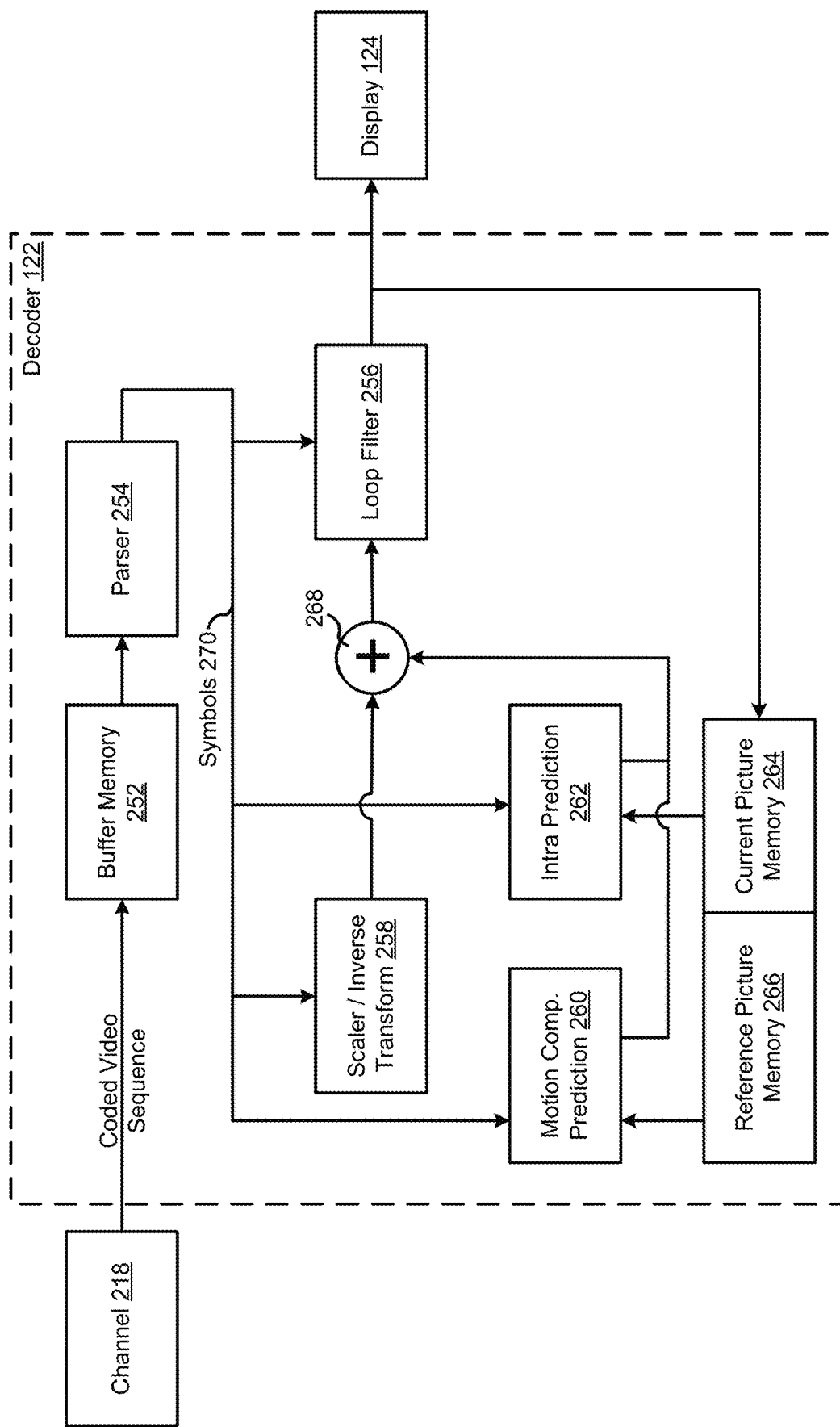
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as one or more integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
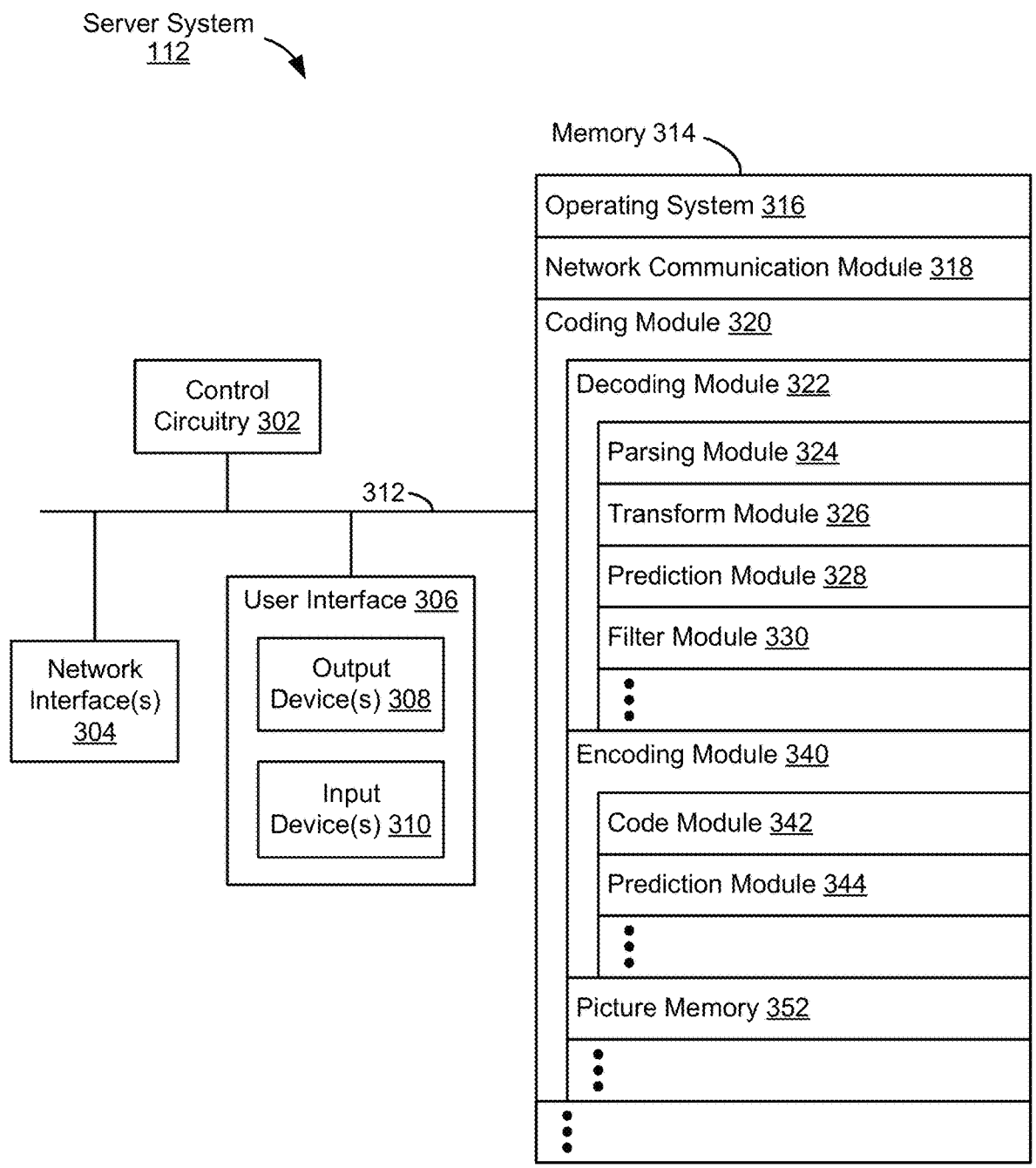
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

Figure 4C:
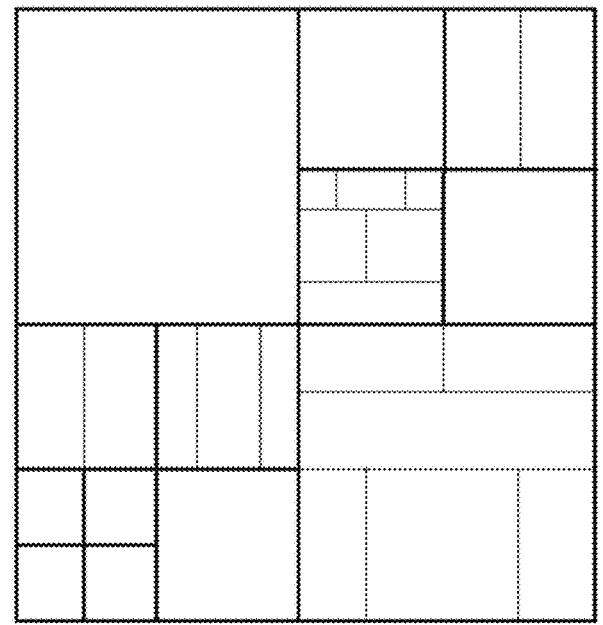
FIGS. 4A-4D illustrate example coding tree structures in accordance with some embodiments.
Figure 4D:
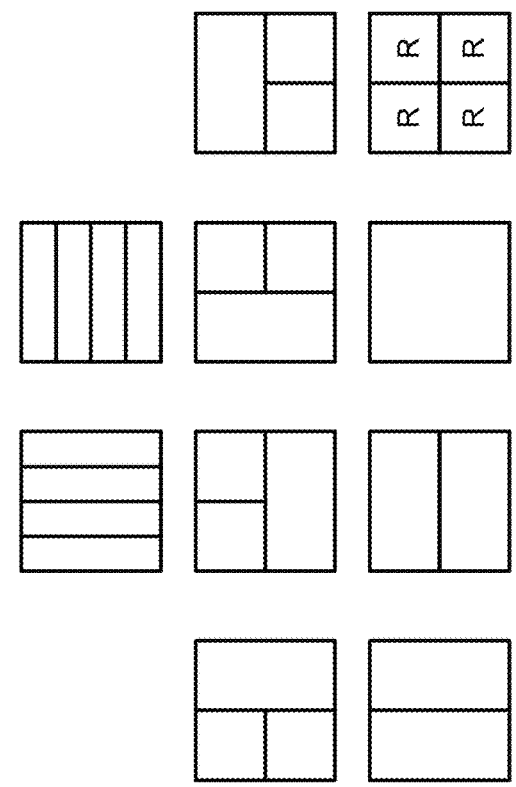
Figure 4A:
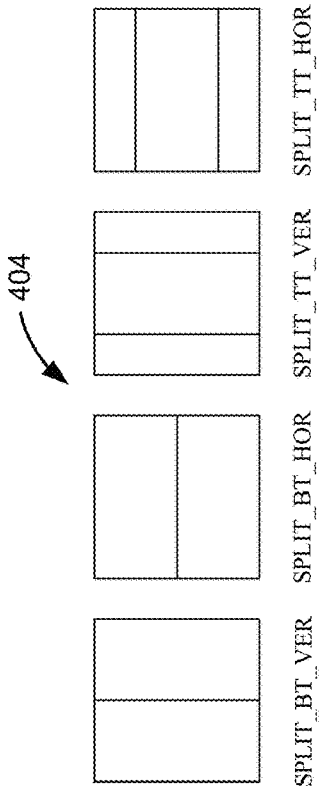

The coding processes and techniques described below may be performed at the devices and systems described above (e.g., the source device 102, the server system 112, and/or the electronic device 120). FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

Figure 4B:
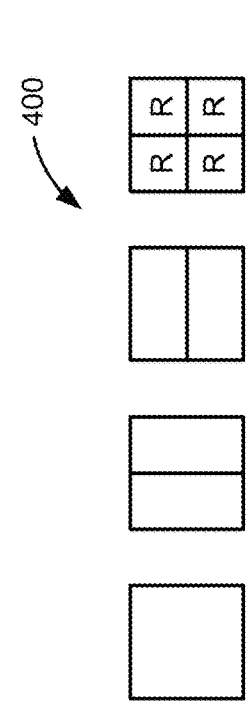

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length, this segmentation is used for prediction and transform processing without any further partitioning. In most cases, the CU, PU, and TU have the same block size in the quad-tree with nested multi-type tree coding block structure. An example of block partitions for one CTU (406) is shown in FIG. 4D, which illustrates an example quadtree with nested multi-type tree coding block structure.

Motion estimation involves determining motion vectors that describe the transformation from one image (picture) to another. The reference image (or block) can be from an adjacent frame in a video sequence. The motion vectors may relate to the whole image (global motion estimation) or a particular block. Additionally, the motion vectors can correspond to a translational or warped model that approximates the motion (e.g., rotation and translation in three dimensions and zoom). Motion estimated can be improved in some circumstances (e.g., with more complicated video objects) by further partitioning the blocks.

A geometric partitioning mode (GPM) may focus on inter-picture predicted blocks (e.g., CUs). When GPM is applied to a block, the block is split into two parts via a straight partitioning boundary. The location of the partitioning boundary may be mathematically defined by an angle parameter $\varphi$ and an offset parameter $\rho$. These parameters may be quantized and combined into a GPM partitioning index lookup table. The GPM partitioning index of the current block may be coded into the bitstream. For example, 64 partitioning modes are supported by GPM in VVC for a CU with a size of w×h=$2k×2l$ (in terms of luma samples) with k, l∈{3 . . . 6}. GPM may be disabled on a CU that has an aspect ratio larger than 4:1 or smaller than 1:4, e.g., because narrow CUs rarely contain geometrically separated patterns.

After partitioning, the two GPM sections (partitions) contain individual motion information that can be used to predict the corresponding sections in the current block. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the merge candidate list, to ensure that only unidirectional motion information is contained.

Figure 5A:
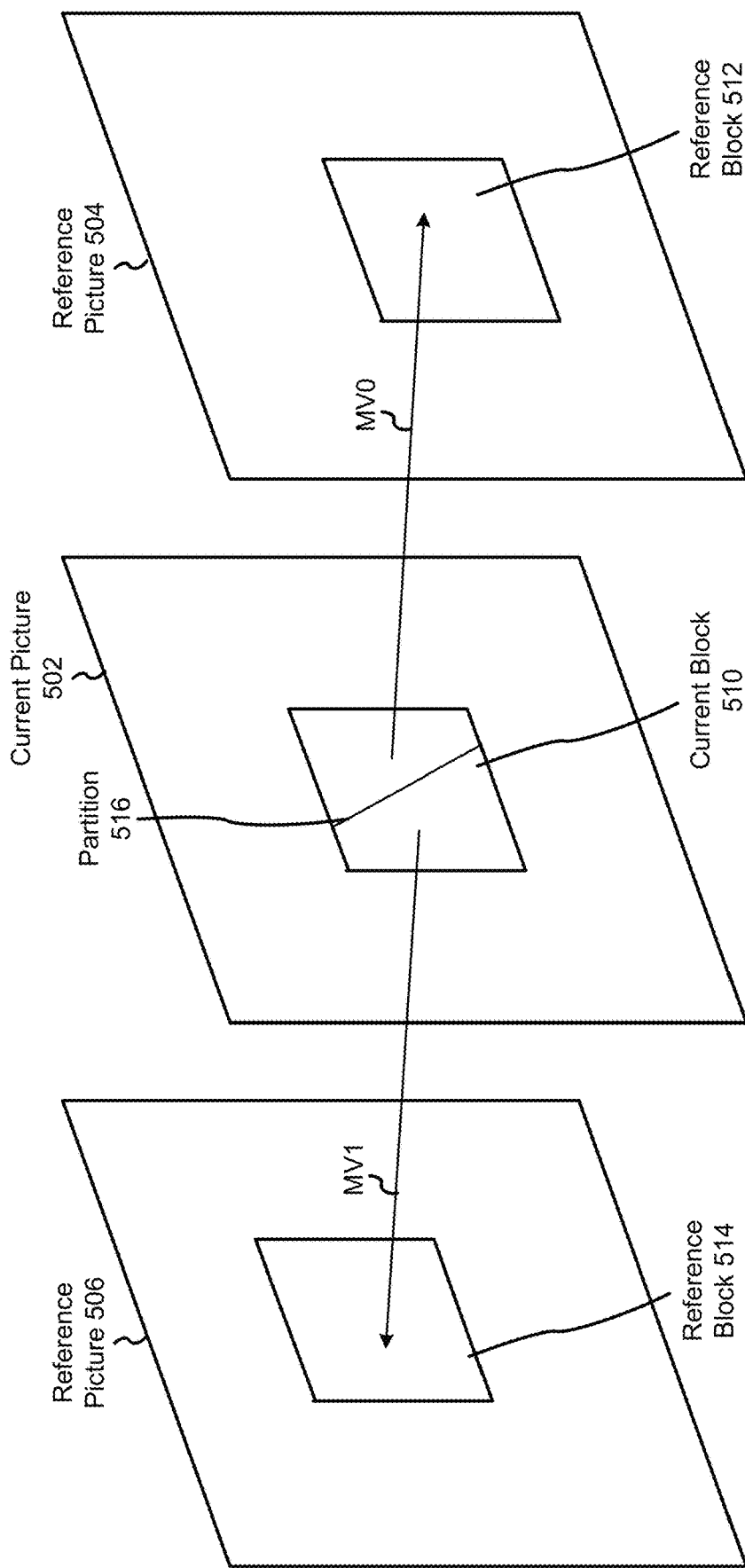
FIG. 5A shows an example of a partition-based prediction mode in accordance with some embodiments.

FIG. 5A illustrates a prediction process of GPM in accordance with some embodiments. A current block 510 is partitioned into a right-side section and a left-side section via a partition 516. The right-side predicted part of the current block 510 (e.g., a CU) of a current picture 502 (e.g., with a size of w×h) is predicted by MV0 from reference block 512 of reference picture 504, whereas the left-side part is predicted by MV1 from reference block 514 of reference picture 506.

Figure 5B:
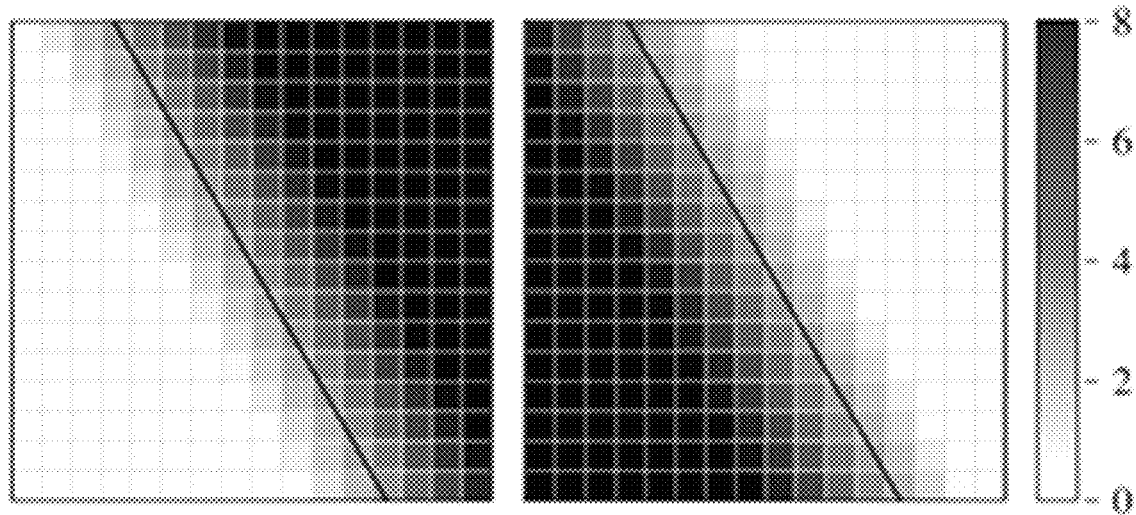
FIGS. 5B-5C show example partitioning mode blendings in accordance with some embodiments.

FIG. 5B illustrates example blending matrices for a partition (e.g., the partition 516) in accordance with some embodiments. In this example, a final GPM prediction (PG) is generated by performing a blending process using integer blending matrices W0 and W1, e.g., containing weights in the value range of 0 to 8. This can be expressed as:

Blended Prediction $$PG = (W0 \circ P0 + W1 \circ P1 + 4) \gg 3 \quad \text{Equation 1}$$

$$\text{with } W0 + W1 = 8J$$

In Equation 1, J is a matrix of ones with a size of w×h. The weights of the blending matrix may depend on the displacement between the sample location and the partitioning boundary. The computational complexity of blending matrices derivation can be low, so that these matrices can be generated on-the-fly at the decoder side. >> in Equation 1 indicates a shift right operation.

The generated GPM prediction (PG) can then be subtracted from the original signal to generate the residuals. The residuals may be transformed, quantized, and coded into the bitstream, e.g., using the regular VVC transformation, quantization, and entropy coding engines. At the decoder side, the signal is reconstructed by adding the residuals to the GPM prediction PG. A skip mode can also be supported by GPM, e.g., when the residuals are negligible. For example, the residual is dropped by the encoder, and the GPM prediction PG is directly used by the decoder as the reconstructed signal.

Figure 5C:
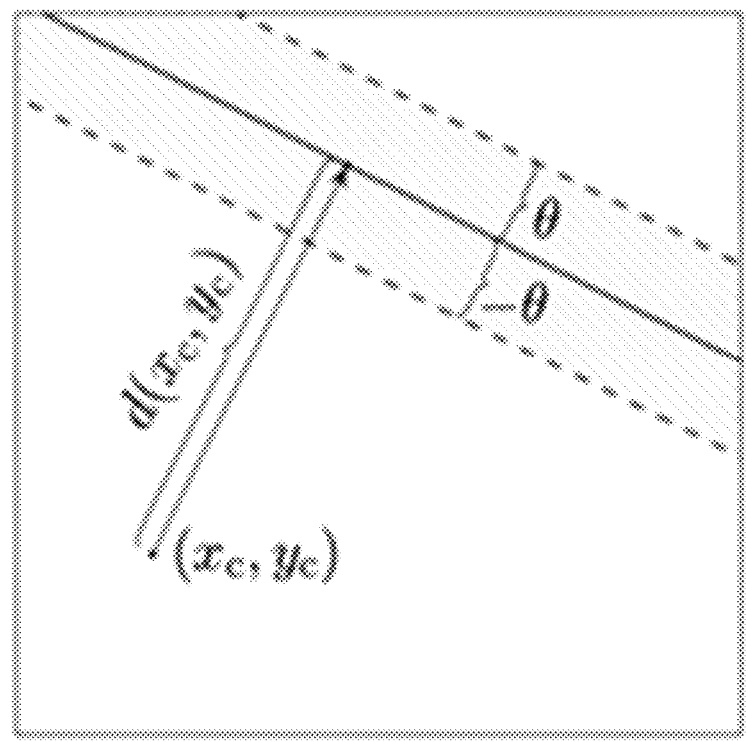

The GPM can be further enhanced, e.g., by GPM+TM (bilateral matching), GPM+MMVD (merge mode with motion vector difference), and Inter+Intra GPM. As shown in FIG. 5C, the blending strength or blending area width θ may be fixed for all different contents. In some embodiments, the weighing values in the blending mask are given by a ramp function:

Blending Ramp Function $$\omega_{x_c, y_c} \begin{cases} 0 & d(x_c, y_c) \leq -\theta \\ \dfrac{8}{2\theta}(d(x_c, y_c) + \theta) & -\theta < d(x_c, y_c) < \theta, \\ 8 & d(x_c, y_c) \geq \theta \end{cases} \quad \text{Equation 2}$$

For example, with a fixed θ=2 pel. This ramp function can be quantized as:

Quantized Ramp Function $$\omega_{m,n} = \text{Clip3}(0, 8, (d(m, n) + 32 + 4) \gg 3) \quad \text{Equation 3}$$

Such a design may be not optimal because the fixed blending area width cannot always provide the best blending quality for various types of video contents. For example, video contents may contain strong textures and sharp edges, which require a narrow blending area to preserve the edge information. For camera-captured content, blending is generally required; but the blending area width may be dependent on a number of factors, e.g., the boundaries of the moving objects and the motion distinctiveness of two partitions.

To address this issue, an adaptive blending scheme can be used for the GPM, which dynamically adjusts the width of the blending area surrounding the GPM partition boundary. For example, the width of the blending area (θ) can be selected from a set of predefined values {0, 1, 2, 4, 8}. The optimal blending area width can be determined for each GPM block at the encoder and signaled to the decoder based on a syntax element, e.g., merge_gpm_blending_width_idx. As an example, all predefined blending strength values may be shiftable while all the clipping and shifting operations in the GPM blending process may be kept without any changes.

In addition, the range of the weights may be increased from [0, 8] to [0, 32] to accommodate the increased width of the GPM blending area. Specifically, the weights can be calculated as:

Increased Quantized Ramp Function $$\omega_{x_c, y_c} = \begin{cases} \text{Clip3}(0, 32, (d(m, n) + 16\theta + (\theta \gg \log_2 \theta) & \theta \neq 0 \\ d(m, n) > 0 \ ? \ 32:0 & \theta = 0 \end{cases} \quad \text{Equation 4}$$

Figure 5D:
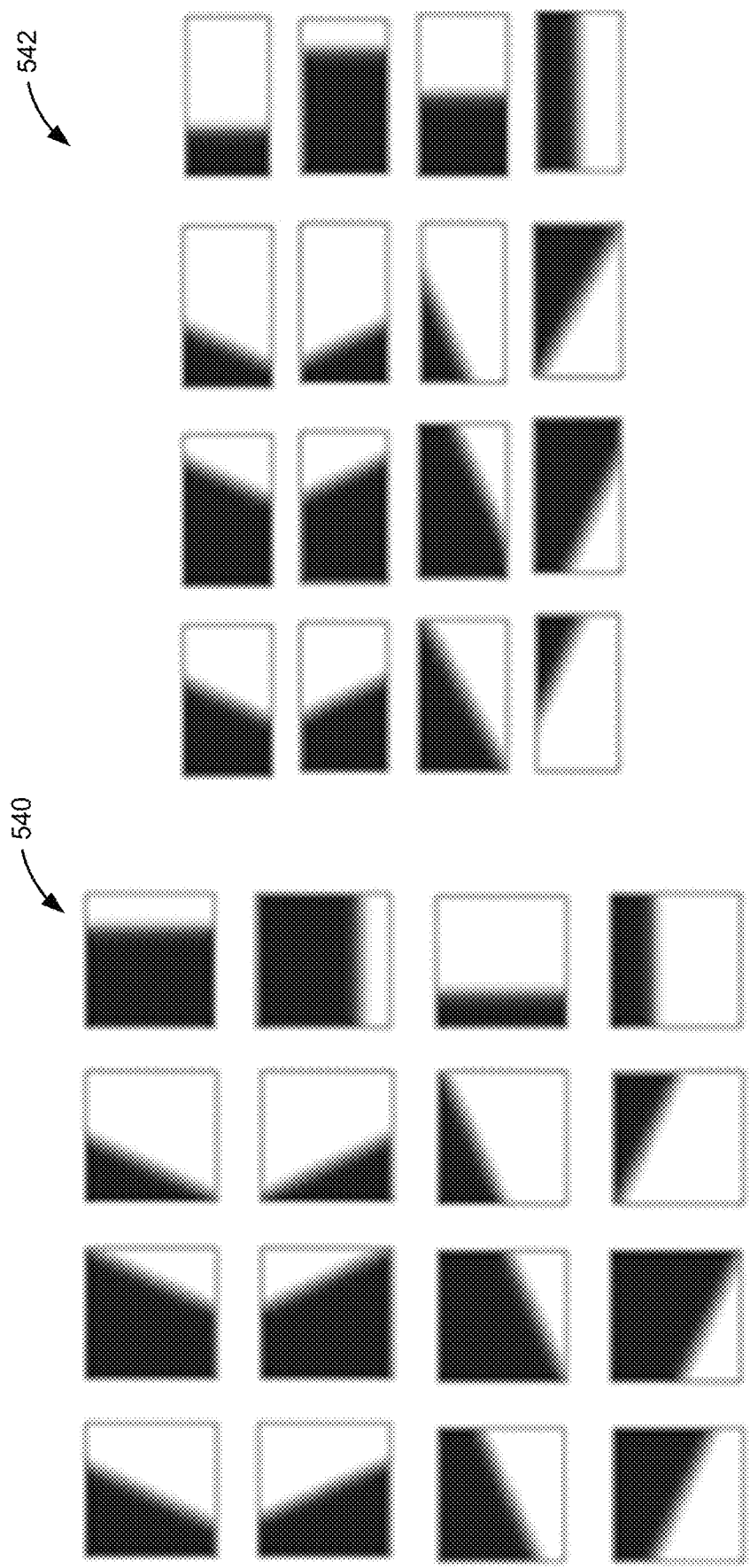
FIG. 5D shows example wedge-based partitioning in accordance with some embodiments.

Wedge-based prediction is a compound prediction mode (e.g., in AV1), which is similar to GPM. The wedge-based prediction can be used for both inter-inter and inter-intra combinations. Boundaries of moving objects are often difficult to approximate by on-grid block partitions. A solution is to predefine a codebook of possible wedge partitions (e.g., 16) and to signal the wedge index in the bitstream when a coding unit is to be further partitioned in such a way. In the current wedge design in AV1, 16 modes are supported because a maximum 16 symbols can be signaled in one syntax element with the multi-symbol adaptive context coding used in AV1. The 16-ary shape codebooks containing partition orientations that are either horizontal, vertical, or oblique (e.g., with slopes ±2 or ±0.5) are designed for both square blocks 540 and rectangular blocks 542 as shown in FIG. 5D. To mitigate spurious high-frequency components, which often are produced by directly juxtaposing two predictors, soft-cliff-shaped 2-D wedge masks may be employed to smooth the edges around the intended partition (e.g., m(i, j) is close to 0.5 around the edges and gradually transforms into binary weights at either end).

The wedge modes in AV1 may be extended to allow for wedge modes to be used for 64×64, 32×64, 64×32, 16×64, and 64×16 blocks. Additionally, the wedge modes may be defined in the Hessian norm form, where an angle indicates the direction of the split boundary, and a distance indicates the offset of the split boundary from the center of a block. The angles may be quantized into values (e.g., 20 values) using tangent values. The distances may be quantized based on block sizes. For example, three distances may be used for angles larger than or equal to 180 degrees, and for 0-degree or 90-degree angles. Four distances may be used for the other angles. In this way, 8×4+12×3=68 modes may be supported. Because more than 16 modes are supported, the wedge index may be signaled with three syntax elements, e.g., the angle direction, angle, and distance. The angle direction indicates whether the angle is smaller than 180 degrees. Depending on the angle direction, the actual angle may be signaled. Depending on the signaled angles, the distance may be signaled.

The wedge blending mask may be quantized directly from the distance between a sample position to the split boundary. Using the Hessian norm form split boundary definition, the distance can be defined as:

Blending Mask Distances $$d(x, y) = x \cos(\varphi) - y \sin(\varphi) + \rho \qquad \text{Equation 5}$$

where $\rho$ is the distance from the center and $\varphi$ is the partition angle. The angles and distances may be quantized using tangent values and block sizes. Thus only lookup tables and shift operations may be needed to calculate the quantized d(m, n) as shown below in Equation 6.

Quantized Distances $$d(m, n) = (((m + \rho_x) \ll 1) - w + 1) \cos LUT[\varphi_i] + \qquad \text{Equation 6}$$
$$(((n + \rho_y) \ll h + 1) \sin LUT[\varphi_i]$$

The blending weight at a corresponding location may be derived using Equation 7:

Blending Weights $$\omega_{m,n} = \text{clamp } (0, 64, (d(m, n) + 32)) \qquad \text{Equation 7}$$

Figure 5E:
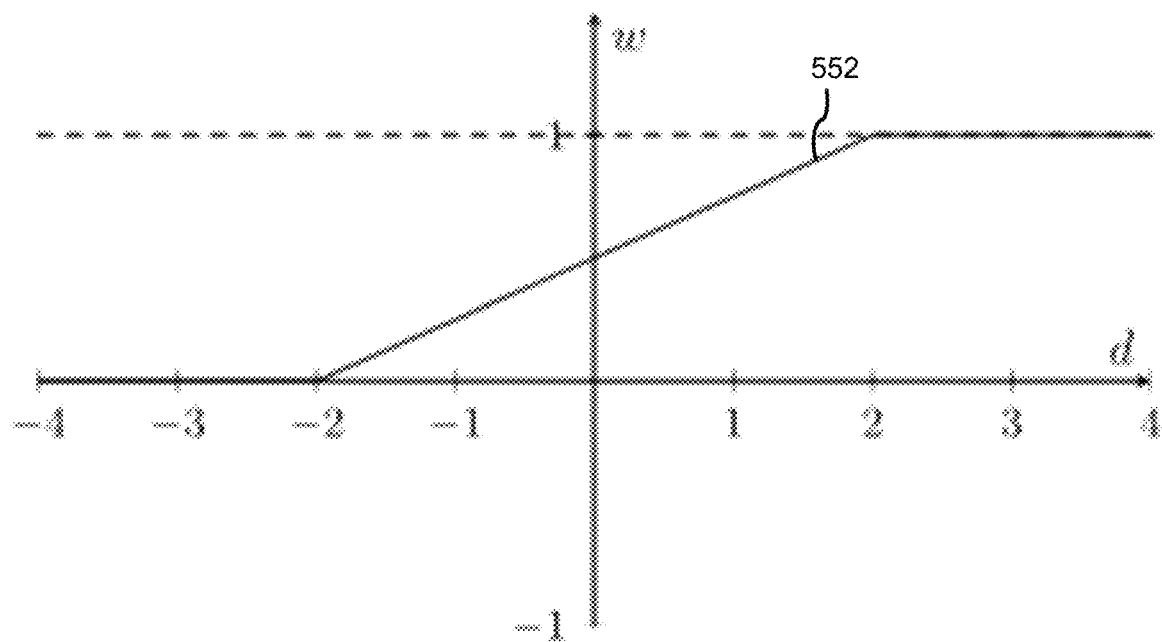
FIGS. 5E-5H show example blending functions in accordance with some embodiments.

The blending weights may be computed on the fly (e.g., because the computational complexity is low), or prestored (e.g., as with the AV1 wedge mode design). However, in AV1, the wedge mode blending is based on a linear function, that is, if the distance d between a sample position to the partitioning boundary is in the range of [−2, 2] (e.g., pixels or pel), the linear ramp function x/4+½ may be used to calculate the corresponding weighting factor of the sample position. In one example, if d is smaller than −2, then a weighting factor of 0 is used, and, if d is larger than 2, then a full blending weighting factor is used. In a continuous case, the full blending weighting factor is 1, and in a quantized case, the full blending factor may depend on the blending precision. For example, if 6 bits is used to express the weighting factor, the full blending factor is 64. In addition, a fixed blending width may be used (e.g., equal to 2 pel). FIG. 5E shows an example linear blending function 552 with a blending width of 2. The linear blending function and the fixed blending width may limit the flexibility for the blending operations for the wedge modes.

The methods and processes described below incorporate adaptive non-linear blendings (e.g., flexible blendings). The adaptive non-linear blendings may be used with the GPM and/or wedge-based prediction processes described previously. Turning now to some example embodiments.

Figure 6A:
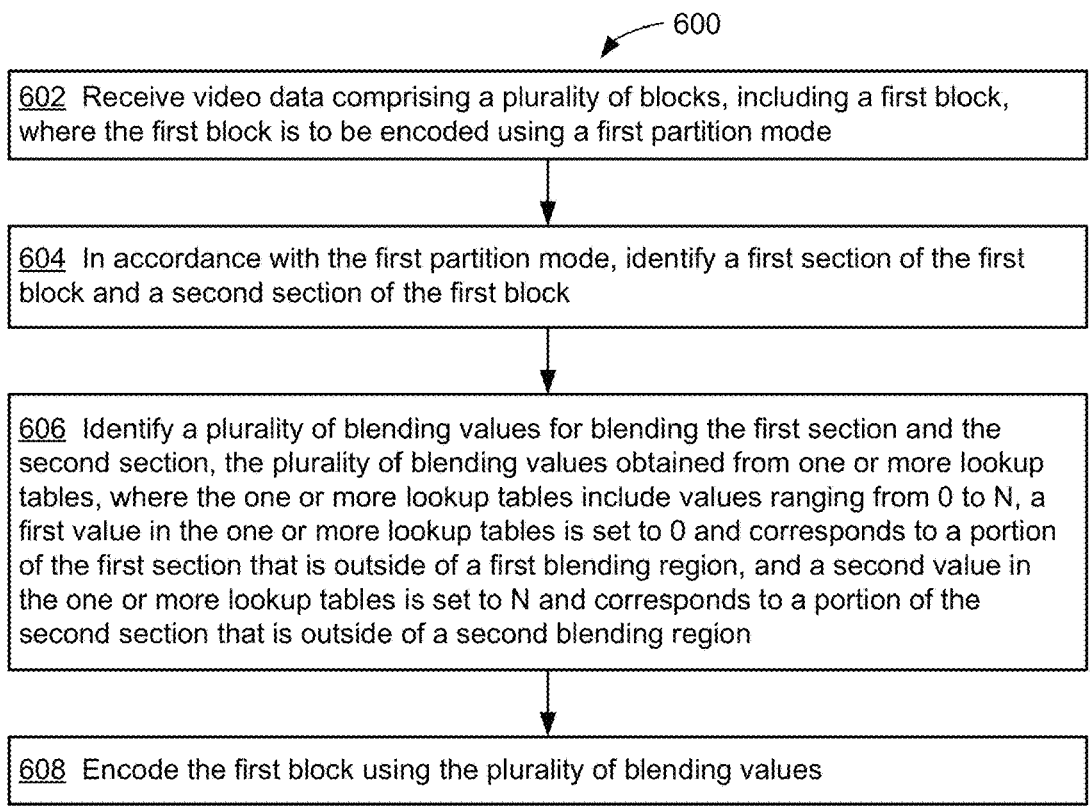
FIG. 6A is a flow diagram illustrating an example method of encoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a plurality of blocks, including a first block, where the first block is to be encoded using a first partition mode. In accordance with the first partition mode, the system identifies (604) a first section of the first block and a second section of the first block. The system identifies (606) a plurality of blending values for blending the first section and the second section, the plurality of blending values obtained from one or more lookup tables, where the one or more lookup tables include values ranging from 0 to N, a first value in the one or more lookup tables is set to 0 and corresponds to a portion of the first section that is outside of a first blending region, and a second value in the one or more lookup tables is set to N and corresponds to a portion of the second section that is outside of a second blending region. The system encodes (608) the first block using the plurality of blending values.

Figure 6B:
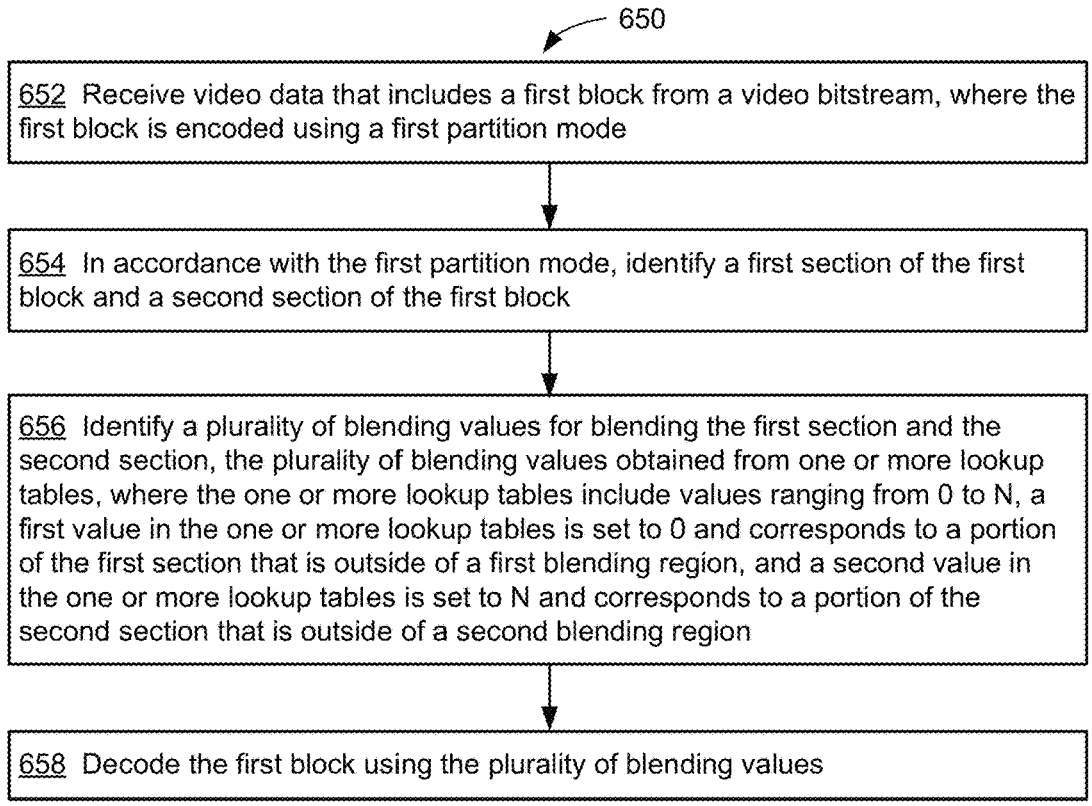
FIG. 6B is a flow diagram illustrating an example method of decoding video in accordance with some embodiments.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data that includes a first block from a video bitstream, where the first block is encoded using a first partition mode. In accordance with the first partition mode, the system identifies (654) a first section of the first block and a second section of the first block. The system identifies (656) a plurality of blending values for blending the first section and the second section, the plurality of blending values obtained from one or more lookup tables, where the one or more lookup tables include values ranging from 0 to N, a first value in the one or more lookup tables is set to 0 and corresponds to a portion of the first section that is outside of a first blending region, and a second value in the one or more lookup tables is set to N and corresponds to a portion of the second section that is outside of a second blending region. The system decodes (658) the first block using the plurality of blending values. In some embodiments, each lookup table includes one or more values that are set to a minimum or a maximum value (e.g., based on a bit precision). In some embodiments, the values set to the minimum or maximum value are used for areas of the first block that are outside of the blending area (e.g., to prevent a blending across the entire first block).

Although FIGS. 6A and 6B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, a non-linear blending function is used to generate the plurality of blending values. For example, a nonlinear function w=f(d) is used to determine the weighting factor w of a sample position depending on the distance d from the sample position to the partitioning boundary. The range of w is [0, full blending] and the range of d is [−θ₁, θ₂], where $\theta_1$ and $\theta_2$ define the blending area width. The values of these two variables may be equal or nonequal. The value d may be quantized into a required and/or predefined precision value $d_m$ (e.g., 1/64). The weighting factor used during reconstruction may be $w_m$=round (c·f($d_m$)), where c equals to the full blending weighting factor (e.g., for 6 bits case, c equals to 64).

Figure 5F:
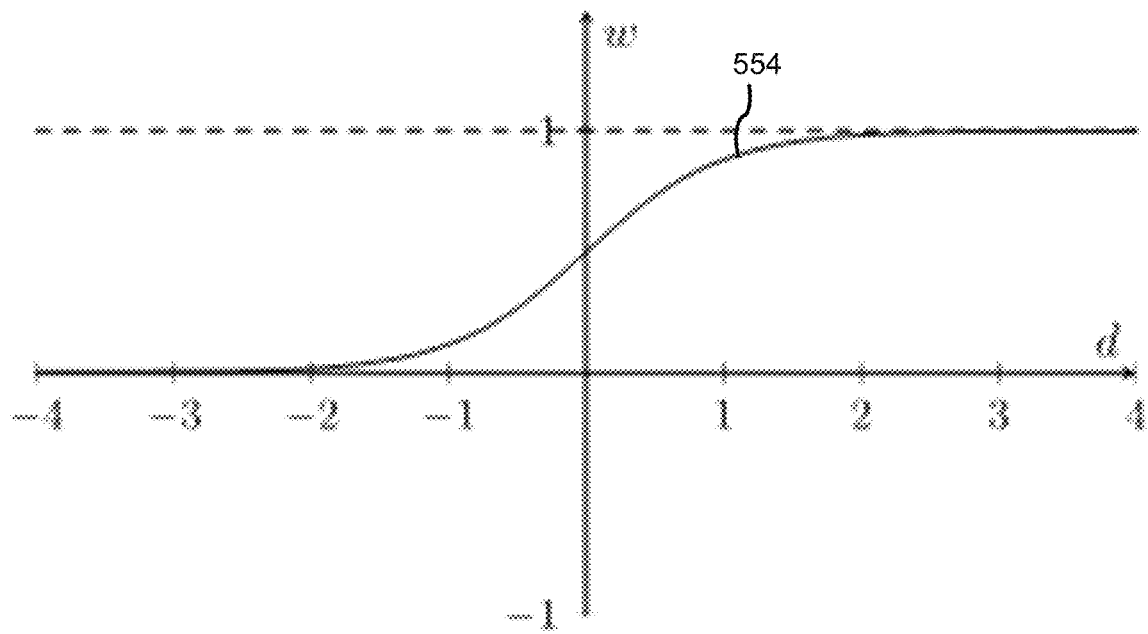

In some embodiments, the non-linear blending function $f(d)$ is a sigmoid function. For example, $$w = \frac{1}{1 + e^{-c1\,d}},$$

where $c_1$ is the coefficient that controls the blending area width. As an example, FIG. 5F shows a sigmoid blending function 554 where $c_1=2$, which corresponds to the shown [−2, 2] pixel blending.

In some embodiments, the sigmoid blending function is quantized into one or more lookup tables (LUTs). For example, for a 1/64 precision $d_m$ the quantized sigmoid-based LUTs are shown below in Tables 1 and 2.

TABLE 1

| Negative Distance Blending Weights LUT | | | | | | | |
|---|---|---|---|---|---|---|---|
| 32 | 32 | 31 | 31 | 30 | 30 | 29 | 29 |
| 28 | 28 | 27 | 27 | 26 | 26 | 25 | 25 |
| 24 | 24 | 23 | 23 | 22 | 22 | 21 | 21 |
| 21 | 20 | 20 | 19 | 19 | 18 | 18 | 18 |
| 17 | 17 | 16 | 16 | 16 | 15 | 15 | 15 |
| 14 | 14 | 14 | 13 | 13 | 13 | 12 | 12 |
| 12 | 11 | 11 | 11 | 11 | 10 | 10 | 10 |
| 9 | 9 | 9 | 9 | 9 | 8 | 8 | 8 |
| 8 | 7 | 7 | 7 | 7 | 7 | 6 | 6 |
| 6 | 6 | 6 | 6 | 5 | 5 | 5 | 5 |
| 5 | 5 | 5 | 4 | 4 | 4 | 4 | 4 |
| 4 | 4 | 4 | 4 | 3 | 3 | 3 | 3 |
| 3 | 3 | 3 | 3 | 3 | 3 | 3 | 2 |
| 2 | 2 | 2 | 2 | 2 | 2 | 2 | 2 |
| 2 | 2 | 2 | 2 | 2 | 2 | 2 | 2 |
| 1 | 1 | 1 | 1 | 1 | 1 | 1 | 0 |

TABLE 2

| Positive Distance Blending Weights LUT | | | | | | | |
|---|---|---|---|---|---|---|---|
| 32 | 32 | 33 | 33 | 34 | 34 | 35 | 35 |
| 36 | 36 | 37 | 37 | 38 | 38 | 39 | 39 |
| 40 | 40 | 41 | 41 | 42 | 42 | 43 | 43 |
| 43 | 44 | 44 | 45 | 45 | 46 | 46 | 46 |
| 47 | 47 | 48 | 48 | 48 | 49 | 49 | 49 |
| 50 | 50 | 50 | 51 | 51 | 51 | 52 | 52 |
| 52 | 53 | 53 | 53 | 53 | 54 | 54 | 54 |
| 55 | 55 | 55 | 55 | 55 | 56 | 56 | 56 |
| 56 | 57 | 57 | 57 | 57 | 57 | 58 | 58 |
| 58 | 58 | 58 | 58 | 59 | 59 | 59 | 59 |
| 59 | 59 | 59 | 60 | 60 | 60 | 60 | 60 |
| 60 | 60 | 60 | 60 | 61 | 61 | 61 | 61 |
| 61 | 61 | 61 | 61 | 61 | 61 | 61 | 62 |
| 62 | 62 | 62 | 62 | 62 | 62 | 62 | 62 |
| 62 | 62 | 62 | 62 | 62 | 62 | 62 | 62 |
| 63 | 63 | 63 | 63 | 63 | 63 | 63 | 64 |

Figure 5G:
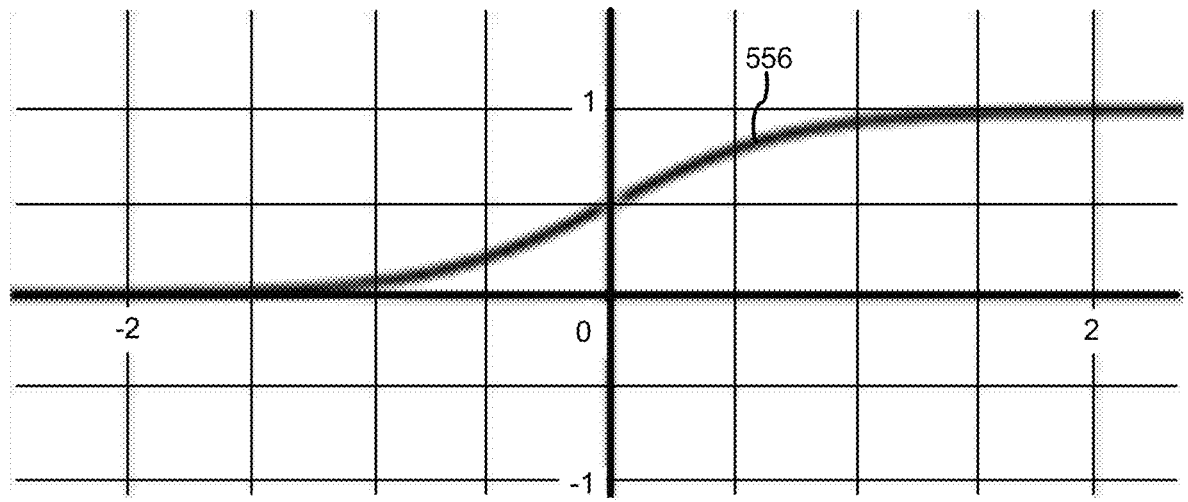

In some embodiments, the final value of each LUT is set to a value that is independent of the function used to determine the other values of the LUT. For example, the value of 0 in Table 1 and the value of 64 in Table 2 are independent of the sigmoid function. In some embodiments, a lookup table is defined using a static constant, such as in the following example code:

static *const* int8_t neg_dist_2_bld_weight[128] = {Table 1};

static *const* int8_t pos_dist_2_bld_weight[128] = {Table 2};

In some embodiments, the non-linear blending function $f(d)$ is a hyperbolic tangent (tanh) function. For example, $w=0.5 \tanh(c1\,d)+0.5$. As an example, FIG. 5G shows a tanh blending function 556 where $c_1=1.3$, which corresponds to the shown [−2, 2] pixel blending.

In some embodiments, the non-linear blending function $f(d)$ is a cosine-based (or other trigonometric) function. For example, $$w = 0.5 \cos\left(\frac{(c1\;x - 1)\pi}{2}\right) + 0.5.$$

Figure 5H:
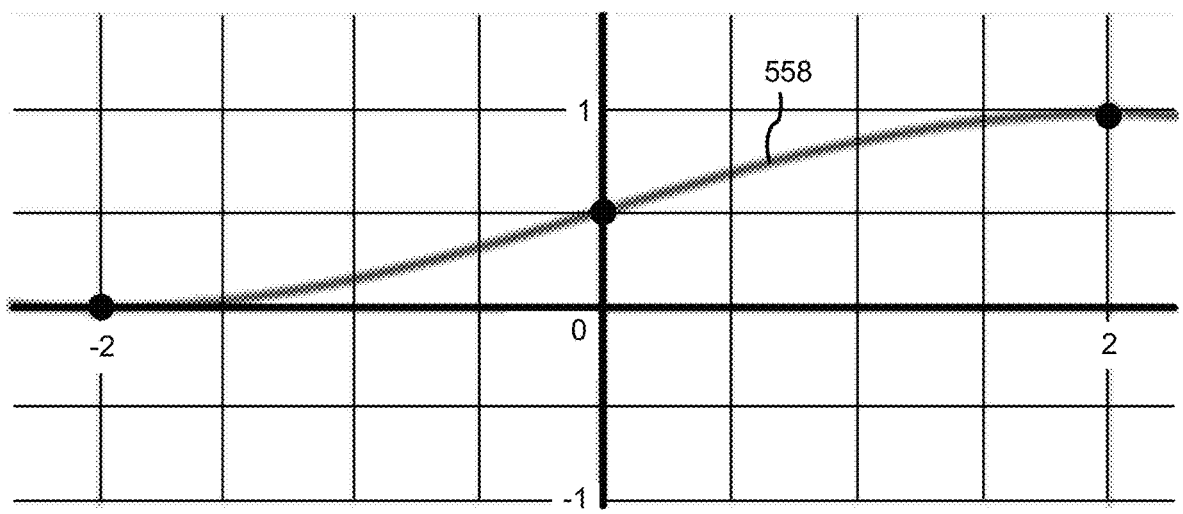

As an example, FIG. 5H shows a cos blending function 558 where $c_1=0.5$, which corresponds to the shown [−2, 2] pixel blending.

In some embodiments, the non-linear blending function $f(d)$ is an exponential-based function. For example, if d is smaller than 0, $w=e^{c1(d-c2)}$, and for d larger than or equal to 0 case, $$w = -\frac{1}{4\;e^{c1(d-c2)+1}}.$$

As an example, $c_1=2$ and $c_2=0.3465735$ result in a roughly [−2, 2] blending area. In some embodiments, the nonlinear blending function is a polynomial-based function. In some embodiments, the non-linear blending functions described above are quantized into one or more LUTs (e.g., depending on the precision of d and full blending value c). In some embodiments, when applying quantization the weighting factor calculated by the blending function is divided by a quantization step size and rounded to the nearest integer. In some embodiments, the derived integer weighting is further adjusted (e.g., by +1, −1, +2, −2).

In some embodiments, a non-linear blending function that includes a coefficient $w=f(c1\,d)$ is used as the blending function. In various embodiments, the coefficient is signaled (e.g., directly signaled or an index of several predefined values is signaled) or derived. In some embodiments, the coefficient, $c_1$ (and/or $c_2$) is signaled to determine the blending width. The parameters specifying the blending function may be signaled in high-level syntax.

In some embodiments, multiple non-linear functions are preselected and used for different ranges of the distance value d. For example, for $d \in [-2,0]$, a sigmoid function $$\left(e.g., w = \frac{1}{q + e^{-c1\,d}}\right)$$

is used and, for $d \in [0, 2]$, a linear function $$\left(e.g., w = \frac{d}{4} + \frac{1}{2}\right)$$

is used. In some embodiments, multiple non-linear, linear, and/or piecewise functions are predefined, and the index of the function that creates the best blending (e.g., with lowest cost) is signaled in the bitstream or derived at the decoder side.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a first block, where the first block is to be encoded using a first partition mode; (ii) in accordance with the first partition mode, identifying a first section of the first block and a second section of the first block; (iii) identifying a plurality of blending values for blending the first section and the second section, the plurality of blending values obtained from one or more lookup tables, where (a) the one or more lookup tables include values ranging from 0 to N, where N is a positive integer, (b) a first value in the one or more lookup tables is set to 0 and corresponds to a portion of the first section that is outside of a first blending region, and (c) a second value in the one or more lookup tables is set to N and corresponds to a portion of the second section that is outside of a second blending region; and (iv) encoding the first block using the plurality of blending values. In some embodiments, the method further includes transmitting the first block via a video bitstream. In some embodiments, the first partition mode is signaled in the video bitstream. In some embodiments, the first value corresponds to a last position in the one or more lookup tables. In some embodiments, the second value corresponds to a last position in the one or more lookup tables.

(A2) In some embodiments of A1, at least a subset of the plurality of blending values correspond to a non-linear blending function (e.g., the non-linear blending functions shown in FIGS. 5F-5H). In some embodiments, a second subset of the plurality of blending values are set to a minimum or maximum value and correspond to portions of the first block that are outside of the blending region.

(A3) In some embodiments of A2, the non-linear blending function is a sigmoid function (e.g., as illustrated in FIG. 5F).

(A4) In some embodiments of any of A1-A3, the one or more lookup tables include quantized values of a non-linear blending function (e.g., as shown in Tables 1 and 2).

(A5) In some embodiments of A4, the method further includes constructing the one or more lookup tables, including: (a) determining a weighting factor from the non-linear blending function; and (b) obtaining a quantized weighting factor by dividing the weighting factor by a quantization step size and rounding to a nearest integer.

(A6) In some embodiments of A5, constructing the one or more lookup tables further includes adjusting the quantized weighting factor by a preset offset prior to insertion into the one or more lookup tables.

(A7) In some embodiments of any of A1-A6, the one or more lookup tables include a lookup table with values as shown in Table 1.

(A8) In some embodiments of any of A1-A7, the one or more lookup tables include a lookup table with values as shown in Table 2.

(B1) In another aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) including a plurality of blocks, including a first block, from a video bitstream, where the first block is encoded using a first partition mode; (ii) in accordance with the first partition mode, identifying a first section of the first block and a second section of the first block; (iii) identifying a plurality of blending values for blending the first section and the second section, the plurality of blending values obtained from one or more lookup tables (e.g., the Tables 1 and 2), (a) where the one or more lookup tables include values ranging from 0 to N, where N is a positive integer, (b) where a first value in the one or more lookup tables is set to 0 and corresponds to a portion of the first section that is outside of a first blending region, and (c) where a second value in the one or more lookup tables is set to N and corresponds to a portion of the second section that is outside of a second blending region; and (iv) decoding the first block using the plurality of blending values. For example, a non-linear function $w=f(d)$ is used to determine the weighting factor w of a sample position depending on the distance d from the sample position to the partitioning boundary. The range of w is [0, full blending] and the range of d is $[-\theta_1, \theta_2]$, where $\theta_1$ and $\theta_2$ define the blending area width. The values of these two variables may be equal or nonequal. The value d may be quantized into a required/predefined precision value $d_m$ (e.g., $\frac{1}{64}$), and the used weighting factor during reconstruction may be $w_m$=round (c $f(d_m)$), where c equals to the full blending weighting factor (e.g., for 6 bits case, c equals to 64). In some embodiments, the first value corresponds to a last position in the one or more lookup tables. In some embodiments, the second value corresponds to a last position in the one or more lookup tables.

In some embodiments, the method includes identifying the first partition mode from a plurality of partition modes for the first block; and identifying a partition boundary for the first block in accordance with the partition mode, the partition boundary distinguishing the first section of the first block from the second section of the first block. In some embodiments, the method includes decoding the first section in accordance with a first predictor and decoding the second section in accordance with a second predictor, different than the first predictor. As an example, the plurality of blending values correspond to the first blending region of the first section of the first block and the second blending region of the second section of the first block.

(B2) In some embodiments of B1, at least a subset of the plurality of blending values correspond to a non-linear blending function. For example, the non-linear blending function is used to determine a weighting factor based on distance from the partition boundary. In some embodiments, a second subset of the plurality of blending values are set to a minimum or maximum value and correspond to portions of the first block that are outside of the blending region(s). In some embodiments, one or more of the plurality of blending values are set to a minimum value (e.g., 0) and one or more of the plurality of blending values are set to a maximum value (e.g., 64). For example, the minimum and maximum values correspond to applying no blending of the sections.

(B3) In some embodiments of B2, the non-linear blending function is a sigmoid function. For example, the non-linear blending function is $w=1/1+e^{-c_1 \cdot d}$, where w is a weighting factor. In this example, a $c_1=2$ results in a roughly $[-2, 2]$ blending area.

(B4) In some embodiments of B2, the non-linear blending function is a hyperbolic tangent function. For example, the non-linear blending function is w=0.5 tanh(c1 d)+0.5, where w is a weighting factor. In this example, a $c_1=1.3$ results in a roughly [−2, 2] blending area.

(B5) In some embodiments of B2, the non-linear blending function is a trigonometric function. For example, the non-linear blending function is $$w = 0.5 \cos\left(\frac{(c1\ x-1)\pi}{2}\right) + 0.5,$$

where w is a weighting factor. In this example, a $c_1=0.5$ results in a roughly [−2, 2] blending area.

(B6) In some embodiments of B2, the non-linear blending function is an exponential-based function. For example, the non-linear blending function is $w=e^{c1(d-c2)}$, if d is less than 0, and $$w = -\frac{1}{4e^{c1(d-c2)+1}},$$

if d is greater than or equal to 0. In this example, $c_1=2$ and $c_2=0.3465735$ result in a roughly [−2, 2] blending area.

(B7) In some embodiments of B2, the non-linear blending function is a polynomial function.

(B8) In some embodiments of any of B2-B7, the method further includes identifying a coefficient for the non-linear blending function, where the coefficient is signaled in the video bitstream or derived, and where the plurality of blending values is identified using the coefficient. For example, a non-linear blending function that includes a coefficient $w=f(c_1, d)$ is used as the blending function. The coefficient may be signaled or derived. In some embodiments, an index is signaled that indicates which lookup table, group, and/or function of coefficients are to be used.

(B9) In some embodiments of B8, the coefficient is a blending weight factor for a sigmoid function. For example, a non-linear blending function $f(d)$ may be a sigmoid function, that is $w=1/(1+e^{\wedge}(-c_1, d))$, and the coefficient $c_1$ may be signaled in the bitstream to determine the blending area width.

(B10) In some embodiments of B8 or B9, the coefficient defines a blending area for the first section and/or the second section.

(B11) In some embodiments of any of B8-B10, the coefficient is signaled in a high-level syntax. In some embodiments, an index is signaled in high-level syntax, where the index indicates which lookup table, group, and/or function is to be used to determine the coefficient. For example, the high-level syntax corresponds to a sequence level, a frame level, a slice level, or a tile level. In some embodiments, the high-level syntax is higher than a block level. For example, the high-level syntax may include VPS, SPS, PPS, APS, a slice header, a picture header, a tile header, and/or a CTU header. In some embodiments, the parameters specifying the non-linear blending function are signaled in high-level syntax, including, but not limited to SPS, a frame header, or a slice header.

(B12) In some embodiments of any of B1-B11, the first blending region has a different width than the second blending region.

(B13) In some embodiments of any of B1-B12, the one or more lookup tables include quantized values of a non-linear blending function. For example, the lookup table (LUT) corresponds to a sigmoid function, tanh function, cosine function, exponential-based function, or a polynomial function. As an example, each blending value is identified from the LUT based on a respective distance from the partition boundary. In some embodiments, the LUT has a precision defined by d (e.g., 1/64) and a blending value defined by c. As an example, a non-linear blending function may be quantized into one or multiple LUTs depending on the precision of d and/or a full blending value c.

(B14) In some embodiments of B13, the method further includes constructing the one or more lookup tables, including: (a) determining a weighting factor from the non-linear blending function; and (b) obtaining a quantized weighting factor by dividing the weighting factor by a quantization step size and rounding to a nearest integer. For example, a weighting factor calculated by the blending function is divided by a quantization step size and rounded to the nearest integer, and the derived integer weighting may be further adjusted by +1, −1, +2, −2, . . . on top of the rounded values. In some embodiments, the quantized weighting factor is inserted into the lookup table.

(B15) In some embodiments of B14, constructing the one or more lookup tables further includes adjusting the quantized weighting factor by a preset offset prior to insertion into the one or more lookup tables. For example, the preset offset may be +1, −1, +2, or −2.

(B16) In some embodiments of any of B1-B3, the one or more lookup tables include a lookup table with values as shown in Table 1.

(B17) In some embodiments of any of B1-B3 and B16, the one or more lookup tables include a lookup table with as values shown in Table 2.

(B18) In some embodiments of any of B1-B17, the method further includes identifying a second plurality of blending values for blending the first section and the second section, the second plurality of blending values corresponding to a second blending function; where the first block is reconstructed using the plurality of blending values and the second plurality of blending values. In some embodiments, multiple non-linear functions are preselected and used for different range of the distance value d. For example, for d∈[−2, 0], a sigmoid function (e.g., $w=1/(1+e^{\wedge}(-c1\ d))$) is used, and for d∈[0, 2] a linear function (e.g., $w=d/4+\frac{1}{2}$) is used.

(B19) In some embodiments of B18, the second blending function is a non-linear function, a linear function, or a piecewise function. For example, multiple non-linear functions, linear functions, and/or piecewise functions are pre-defined. In some embodiments, the index of the function that creates the best blending with lowest cost is signaled in the bitstream or derived at the decoder side.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A8 and B1-B19 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A8 and B1-B19 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
    receiving video data comprising a plurality of blocks, including a first block, from a video bitstream, wherein the first block is encoded using a first partition mode;
    in accordance with the first partition mode, identifying a first section of the first block and a second section of the first block;
    identifying a plurality of blending values for blending the first section and the second section, the plurality of blending values obtained from one or more lookup tables,
        wherein the one or more lookup tables include values ranging from 0 to N, N being a positive integer,
        wherein at least a first value corresponding to a last position in the one or more lookup tables is set to 0 and corresponds to a portion of the first section that is outside of a first blending region, and
        wherein a second value in the one or more lookup tables is set to N and corresponds to a portion of the second section that is outside of a second blending region; and
    decoding the first block using the plurality of blending values.

2. The method of claim 1, wherein at least a subset of the plurality of blending values correspond to a non-linear blending function.

3. The method of claim 2, wherein the non-linear blending function is a sigmoid function.

4. The method of claim 2, further comprising identifying a coefficient for the non-linear blending function, wherein the coefficient is signaled in the video bitstream or derived, and wherein the plurality of blending values are identified using the coefficient.

5. The method of claim 4, wherein the coefficient is a blending weight factor for a sigmoid function.

6. The method of claim 4, wherein the coefficient defines a blending area for the first section and/or the second section.

7. The method of claim 1, wherein the one or more lookup tables include a first lookup table with values {32, 32, 31, 31, 30, 30, 29, 29, 28, 28, 27, 27, 26, 26, 25, 25, 24, 24, 23, 23, 22, 22, 21, 21, 21, 20, 20, 19, 19, 18, 18, 18, 17, 17, 16, 16, 16, 15, 15, 15, 14, 14, 14, 13, 13, 13, 12, 12, 12, 11, 11, 11, 11, 10, 10, 10, 9, 9, 9, 9, 8, 8, 8, 8, 7, 7, 7, 7, 7, 6, 6, 6, 6, 6, 6, 5, 5, 5, 5, 5, 5, 4, 4, 4, 4, 4, 4, 4, 4, 3, 3, 3, 3, 3, 3, 3, 3, 3, 3, 2, 2, 2, 2, 2, 2, 2, 2, 2, 2, 2, 2, 2, 1, 1, 1, 1, 1, 1, 1, 0}.

8. The method of claim 1, wherein the one or more lookup tables include a second lookup table with values {32, 32, 33, 33, 34, 34, 35, 35, 36, 36, 37, 37, 38, 38, 39, 39, 40, 40, 41, 41, 42, 42, 43, 43, 43, 44, 44, 45, 45, 46, 46, 46, 47, 47, 48, 48, 48, 49, 49, 49, 50, 50, 50, 51, 51, 51, 52, 52, 52, 53, 53, 53, 53, 54, 54, 54, 55, 55, 55, 55, 55, 56, 56, 56, 56, 57, 57, 57, 57, 57, 58, 58, 58, 58, 58, 58, 59, 59, 59, 59, 59, 59, 59, 60, 60, 60, 60, 60, 60, 60, 60, 61, 61, 61, 61, 61, 61, 61, 61, 61, 61, 62, 62, 62, 62, 62, 62, 62, 62, 62, 62, 62, 62, 62, 62, 62, 62, 63, 63, 63, 63, 63, 63, 63, 64}.

9. The method of claim 1, wherein the first blending region has a different width than the second blending region.

10. The method of claim 1, wherein the one or more lookup tables include quantized values of a non-linear blending function.

11. The method of claim 10, further comprising constructing the one or more lookup tables, including:
    determining a weighting factor from the non-linear blending function; and
    obtaining a quantized weighting factor by dividing the weighting factor by a quantization step size and rounding to a nearest integer.

12. The method of claim 11, wherein constructing the one or more lookup tables further comprises adjusting the quantized weighting factor by a preset offset prior to insertion into the one or more lookup tables.

13. A computing system, comprising:
    control circuitry;
    memory; and
    one or more sets of instructions stored in the memory and configured for execution by the control circuitry, the one or more sets of instructions comprising instructions for:
        receiving video data comprising a plurality of blocks, including a first block, from a video bitstream, wherein the first block is encoded using a first partition mode;
        in accordance with the first partition mode, identifying a first section of the first block and a second section of the first block;
        identifying a plurality of blending values for blending the first section and the second section, the plurality of blending values obtained from one or more lookup tables, wherein the one or more lookup tables include values ranging from 0 to N, N being a positive integer, wherein at least a first value corresponding to a last position in the one or more lookup tables is set to 0 and corresponds to a portion of the first section that is outside of a first blending region, and wherein a second value in the one or more lookup tables is set to N and corresponds to a portion of the second section that is outside of a second blending region; and decoding the first block using the plurality of blending values.

14. The computing system of claim 13, wherein at least a subset of the plurality of blending values correspond to a non-linear blending function.

15. The computing system of claim 14, wherein the non-linear blending function is a sigmoid function.

16. The computing system of claim 14, wherein the one or more sets of instructions further comprise instructions for identifying a coefficient for the non-linear blending function, wherein the coefficient is signaled in the video bitstream or derived, and wherein the plurality of blending values are identified using the coefficient.

17. The computing system of claim 13, wherein the one or more lookup tables include quantized values of a non-linear blending function.

18. A non-transitory computer-readable storage medium storing one or more sets of instructions configured for execution by a computing device having control circuitry and memory, the one or more sets of instructions comprising instructions for:

receiving video data comprising a plurality of blocks, including a first block, from a video bitstream, wherein the first block is encoded using a first partition mode;

in accordance with the first partition mode, identifying a first section of the first block and a second section of the first block;

identifying a plurality of blending values for blending the first section and the second section, the plurality of blending values obtained from one or more lookup tables, wherein the one or more lookup tables include values ranging from 0 to N, N being a positive integer, wherein at least a first value corresponding to a last position in the one or more lookup tables is set to 0 and corresponds to a portion of the first section that is outside of a first blending region, and wherein a second value in the one or more lookup tables is set to N and corresponds to a portion of the second section that is outside of a second blending region; and decoding the first block using the plurality of blending values.

19. The non-transitory computer-readable storage medium of claim 18, wherein at least a subset of the plurality of blending values correspond to a non-linear blending function.

20. The non-transitory computer-readable storage medium of claim 19, wherein the non-linear blending function is a sigmoid function.

* * * * *